(12) United States Patent
Huang et al.

(10) Patent No.: US 12,408,429 B2
(45) Date of Patent: Sep. 2, 2025

(54) INTEGRATED CIRCUIT DEVICE AND METHOD

(71) Applicant: TAIWAN SEMICONDUCTOR MANUFACTURING COMPANY, LTD., Hsinchu (TW)

(72) Inventors: Chien Yao Huang, Hsinchu (TW); Wun-Jie Lin, Hsinchu (TW); Kuo-Ji Chen, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 18/306,508

(22) Filed: Apr. 25, 2023

(65) Prior Publication Data

US 2023/0261003 A1 Aug. 17, 2023

Related U.S. Application Data

(63) Continuation of application No. 17/024,351, filed on Sep. 17, 2020, now Pat. No. 11,646,317.

(60) Provisional application No. 62/982,488, filed on Feb. 27, 2020.

(51) Int. Cl.
| | |
|---|---|
| *H10D 84/90* | (2025.01) |
| *G06F 30/392* | (2020.01) |
| *G06F 119/06* | (2020.01) |
| *H10D 84/85* | (2025.01) |
| *H10D 89/10* | (2025.01) |

(52) U.S. Cl.
CPC ......... *H10D 84/907* (2025.01); *G06F 30/392* (2020.01); *H10D 84/854* (2025.01); *H10D 89/10* (2025.01); *G06F 2119/06* (2020.01); *H10D 84/853* (2025.01); *H10D 84/961* (2025.01); *H10D 84/991* (2025.01)

(58) Field of Classification Search
CPC .... H10D 84/961; H10D 84/991; H10D 89/10; H01L 2027/11861; H01L 2027/1189; H01L 27/0207
See application file for complete search history.

(56) References Cited

U.S. PATENT DOCUMENTS

| | | | |
|---|---|---|---|
| 7,260,442 B2 | 8/2007 | Hwang et al. | |
| 9,256,709 B2 | 2/2016 | Yu et al. | |
| (Continued) | | | |

FOREIGN PATENT DOCUMENTS

| | | |
|---|---|---|
| CN | 108133933 | 6/2018 |
| CN | 109599400 | 4/2019 |
| CN | 110797337 | 2/2020 |

*Primary Examiner* — Amar Movva
(74) *Attorney, Agent, or Firm* — Hauptman Ham, LLP

(57) ABSTRACT

An integrated circuit (IC) device includes a plurality of first doped regions of a first semiconductor type over at least one first well region of the first semiconductor type, and a second doped region of a second semiconductor type over a second well region of the second semiconductor type. The second semiconductor type is different from the first semiconductor type. The plurality of first doped regions is arranged along a first direction. Each of the plurality of first doped regions has a first length in the first direction. The second doped region extends in the first direction between at least two first doped regions among the plurality of first doped regions over a second length greater than the first length.

20 Claims, 12 Drawing Sheets

(56) References Cited

U.S. PATENT DOCUMENTS

| | | | |
|---|---|---|---|
| 2003/0218841 A1* | 11/2003 | Kodama | H01L 27/0251 |
| | | | 361/56 |
| 2008/0094869 A1 | 4/2008 | Osada et al. | |
| 2012/0168875 A1 | 7/2012 | Tamaru et al. | |
| 2014/0040838 A1 | 2/2014 | Liu et al. | |
| 2015/0278429 A1 | 10/2015 | Chang | |
| 2018/0137231 A1 | 5/2018 | Sakuda | |
| 2019/0065659 A1 | 2/2019 | Biswas et al. | |

* cited by examiner

INTEGRATED CIRCUIT DEVICE AND METHOD

PRIORITY CLAIM

The present application is a continuation application of U.S. application Ser. No. 17/024,351, filed Sep. 17, 2020, now U.S. Pat. No. 11,646,317, issued May 9, 2023, which claims the priority of U.S. Provisional Application No. 62/982,488, filed Feb. 27, 2020. The above-referenced patent(s) and applications are incorporated herein by reference in their entireties.

BACKGROUND

An integrated circuit (IC) typically includes a number of semiconductor devices represented in an IC layout diagram. An IC layout diagram is hierarchical and includes modules which carry out higher-level functions in accordance with the semiconductor device's design specifications. The modules are often built from a combination of cells, each of which represents one or more semiconductor structures configured to perform a specific function. Cells having pre-designed layout diagrams, sometimes known as standard cells, are stored in standard cell libraries (hereinafter "libraries" or "cell libraries" for simplicity) and accessible by various tools, such as electronic design automation (EDA) tools, to generate, optimize and verify designs for ICs.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
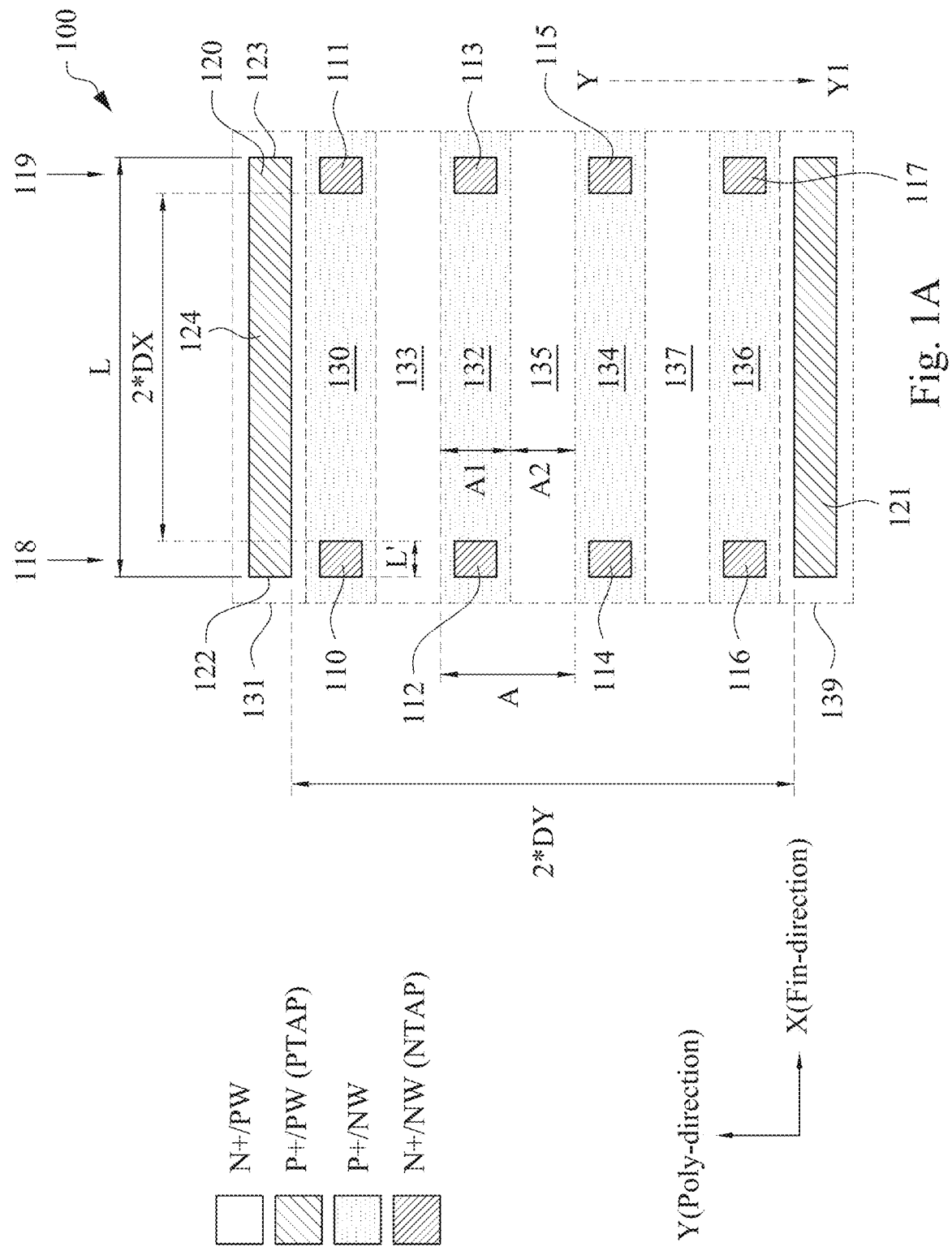
FIG. 1A is a schematic view of an IC layout diagram, in accordance with some embodiments.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Source/drain(s) may refer to a source or a drain, individually or collectively dependent upon the context.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A well tap cell, referred to herein as "TAP cell," is a standard cell which defines a region in a doped well where the doped well is coupled to a bias voltage, such as a power supply voltage. TAP cells are included in an IC layout diagram to improve latch-up immunity of ICs manufactured in accordance with the IC layout diagram.

With the current tendency of scaling down semiconductor devices, placement of TAP cells in an IC layout diagram for manufacturing ICs raises one or more considerations including, but not limited to, process bottleneck due to reduced lithography critical dimension (CD), and mixed channel effects. To address one or more of such considerations, in an IC layout diagram in accordance with some embodiments, first TAP cells of a first semiconductor type (e.g., N-type or P-type) are placed in rows and columns, and second TAP cells of a different, second semiconductor type (e.g., P-type or N-type) are placed in elongated configurations or band shapes across multiple columns of the first TAP cells. As a result, in at least one embodiment, it is possible to achieve one or more effects, including, but not limited to, relaxing of process constraints, increasing of latch-up immunity, reducing of areas occupied or blocked by TAP cells, and increasing of areas where standard cells other than TAP cells are placeable.

FIG. 1A is a schematic view of an IC layout diagram 100 of an IC device, in accordance with some embodiments. The IC layout diagram 100 comprises a plurality of first TAP cells 110-117 of a first semiconductor type, and a plurality of second TAP cells 120, 121 of a second semiconductor type different from the first semiconductor type. The first TAP cells 110-117 are arranged in at least two columns 118, 119. For example, the first TAP cells 110, 112, 114, 116 are arranged in the column 118, and the first TAP cells 111, 113, 115, 117 are arranged in the column 119. The columns 118, 119 are adjacent each other in a first direction, e.g., X direction, and extend in a second direction, e.g., Y direction, transverse to the first direction. At least one of the second TAP cells 120, 121 extends in the X direction between the columns 118, 119 over a length L greater than a length L' of each of the first TAP cells 110-117 in the X direction. The at least one of the second TAP cells 120, 121 overlaps, in the Y direction along the page, at least one first TAP cell in at least one of the columns 118, 119.

In the example configuration in FIG. 1A, the second TAP cell 120 is elongated in the X direction, and has a length L in the X direction greater than its height in the Y direction. The second TAP cell 120 overlaps, in the Y direction, the first TAP cells 110-117. For example, the second TAP cell 120 extends continuously in the X direction from a first end 122 to a second end 123 thereof. The first end 122 of the second TAP cell 120 overlaps, in the Y direction, the first TAP cells 110, 112, 114, 116 in the column 118. The second end 123 of the second TAP cell 120 overlaps, in the Y direction, the first TAP cells 111, 113, 115, 117 in the column 119. A middle portion 124 of the second TAP cell 120 is between the first end 122 and the second end 123, and overlaps none of the first TAP cells 110-117 in the Y direction. The second TAP cell 121 has an elongated configuration similar to that described above with respect to the second TAP cell 120. The second TAP cells 120, 121 are adjacent each other in the Y direction, and there is no other TAP cell of the second semiconductor type between the second TAP cells 120, 121. The second TAP cells 120, 121 sandwich therebetween multiple rows and columns of the first TAP cells, namely, the two columns 118, 119, and four rows formed respectively by the first TAP cells 110 and 111, the first TAP cells 112 and 113, the first TAP cells 114 and 115, and the first TAP cells 116 and 117.

The configuration described above with respect to FIG. 1A is an example, and other configurations are within the scopes of various embodiments. For example, some embodiments include different numbers of first TAP cells in each of the columns 118, 119 and/or different numbers of columns of first TAP cells sandwiched between each pair of adjacent second TAP cells 120, 121. In at least one embodiment, at least one of the second TAP cells 120, 121 has a configuration different from that described above with respect to FIG. 1A. For example, at least one of the first end 122 or second end 123 of the second TAP cell 120 does not overlap the corresponding column 118 or 119 in the Y direction. For another example, the second TAP cells 120, 121 have different lengths in the X direction. In a further example, at least one of the second TAP cells 120, 121 is not a single second TAP cell extending continuously in the X direction as described with respect to FIG. 1A, but instead comprises a series of discrete second TAP cells as described herein with respect to FIG. 3B.

The IC layout diagram 100 further comprises a plurality of first well regions 130, 132, 134, 136 of the first semiconductor type, and a plurality of second well regions 131, 133, 135,137, 139 of the second semiconductor type. The first well regions 130, 132, 134, 136 and the second well regions 131, 133, 135,137, 139 extend in the X direction, and are arranged alternatingly in the Y direction. Each of the first TAP cells 110-117 is in a corresponding one of the first well regions 130, 132, 134, 136, and each of the second TAP cells 120, 121 is in a corresponding one of the second well regions 131, 133, 135,137, 139. For example, the first TAP cells 110 and 111 are in the first TAP cell 130, the first TAP cells 112 and 113 are in the first TAP cell 132, the first TAP cells 114 and 115 are in the first TAP cell 134, and the first TAP cells 116 and 117 are in the first TAP cell 136, whereas the second TAP cell 120 is in the second well region 131, and the second TAP cell 121 is in the second well region 139.

In the example configuration in FIG. 1A, the first semiconductor type is N-type and the second semiconductor type is P-type. In other words, the first well regions 130, 132, 134, 136 are N-type well regions (hereinafter "N wells"), the second well regions 131, 133, 135,137, 139 are P-type well regions (hereinafter "P wells"), the first TAP cells 110-117 are N-type TAP cells (hereinafter "NTAP cells"), and the second TAP cells 120, 121 are P-type TAP cells (hereinafter "PTAP cells"). An N well is a region that includes N-type dopants, whereas a P well is a region that includes P-type dopants. In the drawings, N wells are labelled as "NW," P wells are labelled as "PW," N-type dopants are labelled as "N+" and P-type dopants are labelled as "P+."

An NTAP cell is a region in an N well, but with a higher concentration of N-type dopants than the N well itself. For example, the NTAP cell 110 has a higher concentration of N-type dopants than the N well 130 in which the NTAP cell 110 is formed. A PTAP cell is a region in a P well, but with a higher concentration of P-type dopants than the P well itself. For example, the PTAP cell 120 has a higher concentration of P-type dopants than the P well 131 in which the PTAP cell 120 is formed.

In an N well, P-type active regions with P-type dopants are arranged in areas not occupied or blocked by NTAP cells to form one or more circuit elements. In a P well, N-type active regions with N-type dopants are arranged in areas not occupied or blocked by PTAP cells to form one or more circuit elements. Examples of circuit elements include, but are not limited to, transistors and diodes. Examples of transistors include, but are not limited to, metal oxide semiconductor field effect transistors (MOSFET), complementary metal oxide semiconductor (CMOS) transistors, bipolar junction transistors (BJT), high voltage transistors, high frequency transistors, P-channel and/or N-channel field effect transistors (PFETs/NFETs), etc.), FinFETs, planar MOS transistors with raised source/drains, or the like. For example, in the N wells 130, 132, 134, 136, P-type active regions (not shown in FIG. 1A, but described herein with respect to FIG. 1C) are arranged in the areas not occupied or blocked by the NTAP cells 110-117 to define P-channel metal-oxide semiconductor (PMOS) regions for forming PMOS transistors. In the P wells 133, 135, 137, N-type active regions (not shown in FIG. 1A, but described herein with respect to FIG. 1C) are arranged in the areas not occupied or blocked by the PTAP cells 120, 121 to define N-channel metal-oxide semiconductor (NMOS) regions for forming NMOS transistors. A cell having a pre-designed layout diagram is read from a cell library and placed in the IC layout diagram 100 such that NMOS transistors of the cell are arranged in an NMOS region, whereas PMOS transistors of the cell are arranged in a PMOS region. NTAP cells, PTAP cells, N-type active regions and P-type active regions are sometimes commonly referred to as oxide-definition (OD) regions, and are schematically illustrated in FIG. 1B with the label "OD."

Figure 1B:
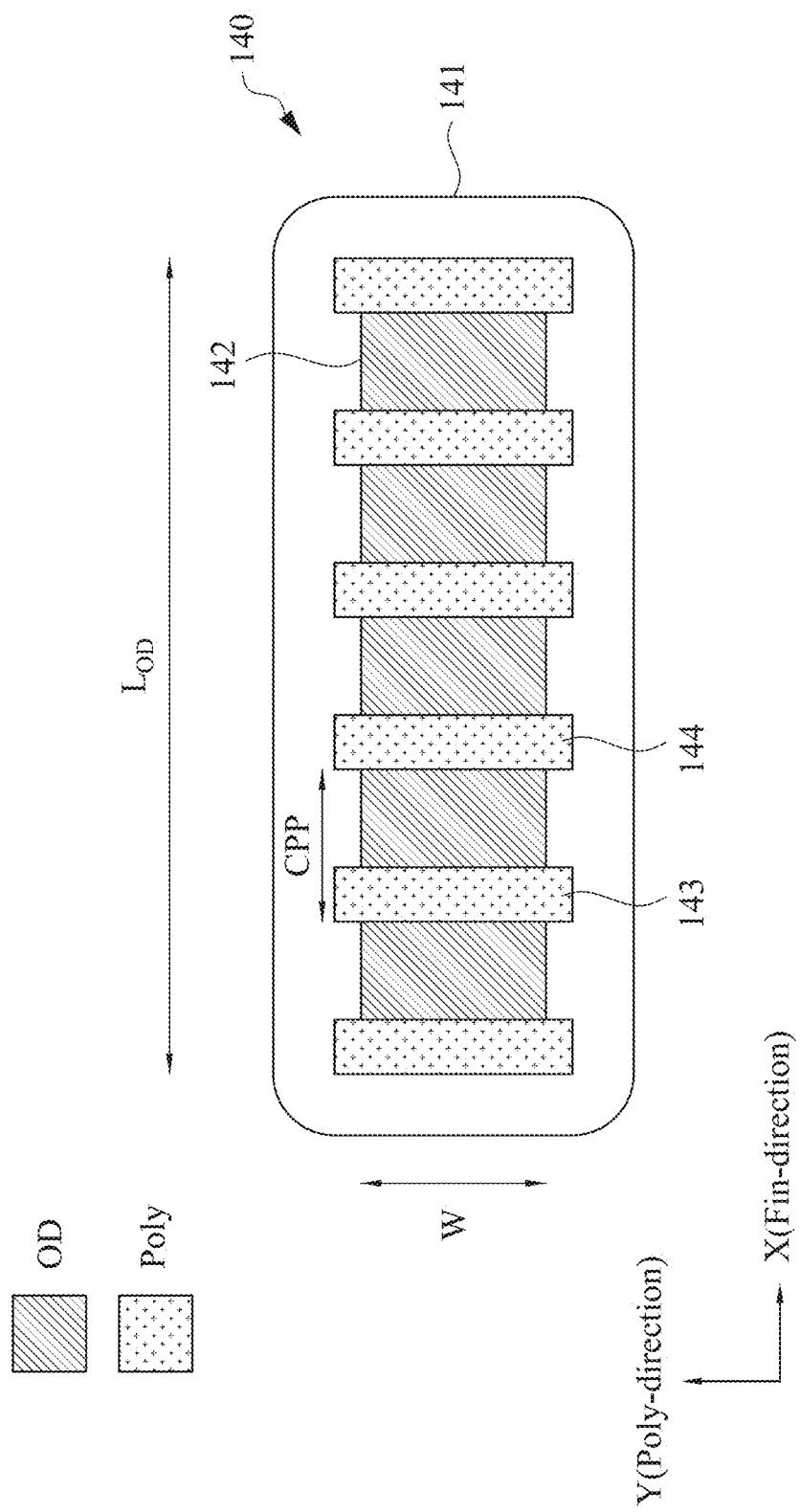
FIG. 1B is a schematic, enlarged view of a portion of an IC layout diagram, in accordance with some embodiments.

The IC layout diagram 100 further comprises gate regions (not shown in FIG. 1A, but described herein with respect to FIG. 1B) which include a conductive material, such as, polysilicon, and are schematically illustrated in FIG. 1B with the label "Poly." Other conductive materials for the gate regions, such as metals, are within the scopes of various embodiments. The gate regions extend, or are elongated, in the Y direction across the OD regions. The Y direction is also referred to herein as the Poly direction. In some embodiments, each OD region has one or more fin features arranged therein. Such fin features extend, or are elongated, in the X direction, and spaced from each other in the Y direction. The X direction is also referred to herein as the Fin direction. An example of a fin feature is described with respect to FIG. 6.

In at least one embodiment, a number of fin features in each of the first TAP cells 110-117 and a number of fin features in each of the second TAP cells 120, 121 satisfy the following relationship:

$$F2/F1 \geq (DY/DX)*(L/A) \quad (1)$$

where

F1 is the number of fin features in each of the first TAP cells 110-117,

F2 is the number of fin features in each of second TAP cells 120, 121 which are elongated in the X direction, DX is a half of a first distance 2*DX in the X direction between facing sides of the first TAP cells in the adjacent columns 118, 119, DY is a half of a second distance 2*DY in the Y direction between facing sides of the second TAP cells 120, 121, L is the length of the second TAP cell 120 or 121 in the X direction, and A is a cell height in the Y direction, and is a sum of a height A1 of a first well region (e.g., 132) and a height A2 of an adjacent second well region (e.g., 135).

In the example configuration in FIG. 1A, F1 is the number $F_{NTAP}$ of fin features in each NTAP cell, and F2 is the number $F_{PTAP}$ of fin features in each PTAP cell, and the relationship (1) becomes $$F_{PTAP}/F_{NTAP} \geq (DY/DX)*(L/A) \quad (1')$$

By configuring the NTAP cells and PTAP cells to have different configurations and to satisfy the relationship (1) or (1'), it is possible in some embodiments to match or improve a latch-up (LUP) immunity index compared to another approach. Specifically, the LUP immunity index of an IC device corresponding to the IC layout diagram 100 is determined by the following relationship $$V = Jbody*L*(A/2)*(2DY/A)*(Rc/F_{PTAP}) \quad (2)$$

where

V is the LUP immunity index represented by a voltage drop caused by a leakage current Jbody in the IC device, and Rc is a unit resistance.

The lower the voltage drop V, the better LUP immunity of the IC device.

In another approach where the NTAP cells and PTAP cells are configured similarly to each other, and similarly to the NTAP cells 110-117, the LUP immunity index V' of an IC device in accordance with the another approach is determined by the following relationship $$V' = Jbody*2DX*(A/2)*(Rc/F_{NTAP}) \quad (3)$$

To match or improve the LUP immunity index compared to the another approach, the following relationship is to be satisfied:

$$V \leq V' \quad (4)$$

Based on the relationships (2), (3) and (4), the relationships (1') and (1) are obtained.

In some embodiments, the IC layout diagram 100 satisfies at least one of the following: DY is from 0.5 µm to 1000 µm, DX is from 0.05 µm to 100 µm, L is from 0.1 µm to 5000 µm, or A is from 0.025 µm to 0.300 µm. The range of 0.025 µm to 0.300 µm of the cell height A corresponds to one or more considerations and/or constraints in an example semiconductor manufacturing process. At the range of 0.025 µm to 0.300 µm of the cell height A, if DX is below the range of 0.05 µm to 100 µm and/or if DY is below the range of 0.5 µm to 1000 µm, there is an excessive increase in the chip area of TAP cells with an associated decrease in the remaining chip area for other functional cells of the IC layout diagram 100. At the range of 0.025 µm to 0.300 µm of the cell height A, if DX is above the range of 0.05 µm to 100 µm and/or if DY is above the range of 0.5 µm to 1000 µm, there is an elevated risk of latch-up. The range of 0.1 µm to 5000 µm for the length L of the elongated TAP cells (e.g., 120 or 121) is derived from the respective range(s) for A, DX and/or DY based on the relationship (1) or (1').

FIG. 1B is a schematic, enlarged view of a portion 140 of the IC layout diagram 100, in accordance with some embodiments, for describing an example to determine the number of fin features in a TAP cell. The portion 140 includes a well region 141, an OD region 142, and a plurality of gate regions 143, 144. The well region 141 extends in the X direction, and surrounds or encloses therein the OD region 142. The OD region 142 includes one or more fin features (not shown) which extend in the X direction. The OD region 142 has a length $L_{OD}$ in the X direction, and a height W in the Y direction. The gate regions 143, 144 extend in the Y direction across the OD region 142, and are arranged at a pitch CPP in the X direction.

The number F of fin features in the OD region 142 is determined by $$F = (L_{OD}/CPP)*W*Fn \quad (5)$$

where Fn is a number of fin features per unit height in the Y direction. In at least one embodiment, CPP and W are the same for all TAP cells.

In an example, the portion 140 corresponds to a region containing a first TAP cell, e.g., 110 in FIG. 1A. Specifically, the well region 141 corresponds to the first well region 130, the OD region 142 corresponds to the first TAP cell 110, $L_{OD}$ corresponds to the length L' of the first TAP cell 110, W corresponds to the height of the first TAP cell 110 in the Y direction, and F corresponds to F1 or $F_{NTAP}$ which is the number of fin features in the first TAP cell 110. Accordingly, the number of fin features in each first TAP cell is determinable from the relationship (5).

In another example, the portion 140 corresponds to a region containing a second TAP cell, e.g., 120 in FIG. 1A. Specifically, the well region 141 corresponds to the second well region 131, the OD region 142 corresponds to the second TAP cell 120, $L_{OD}$ corresponds to the length L of the second TAP cell 120, W corresponds to the height of the second TAP cell 120 in the Y direction, and F corresponds to F2 or $F_{PTAP}$ which is the number of fin features in the second TAP cell 120. Accordingly, the number of fin features in each second TAP cell is also determinable from the relationship (5).

Figure 1C:
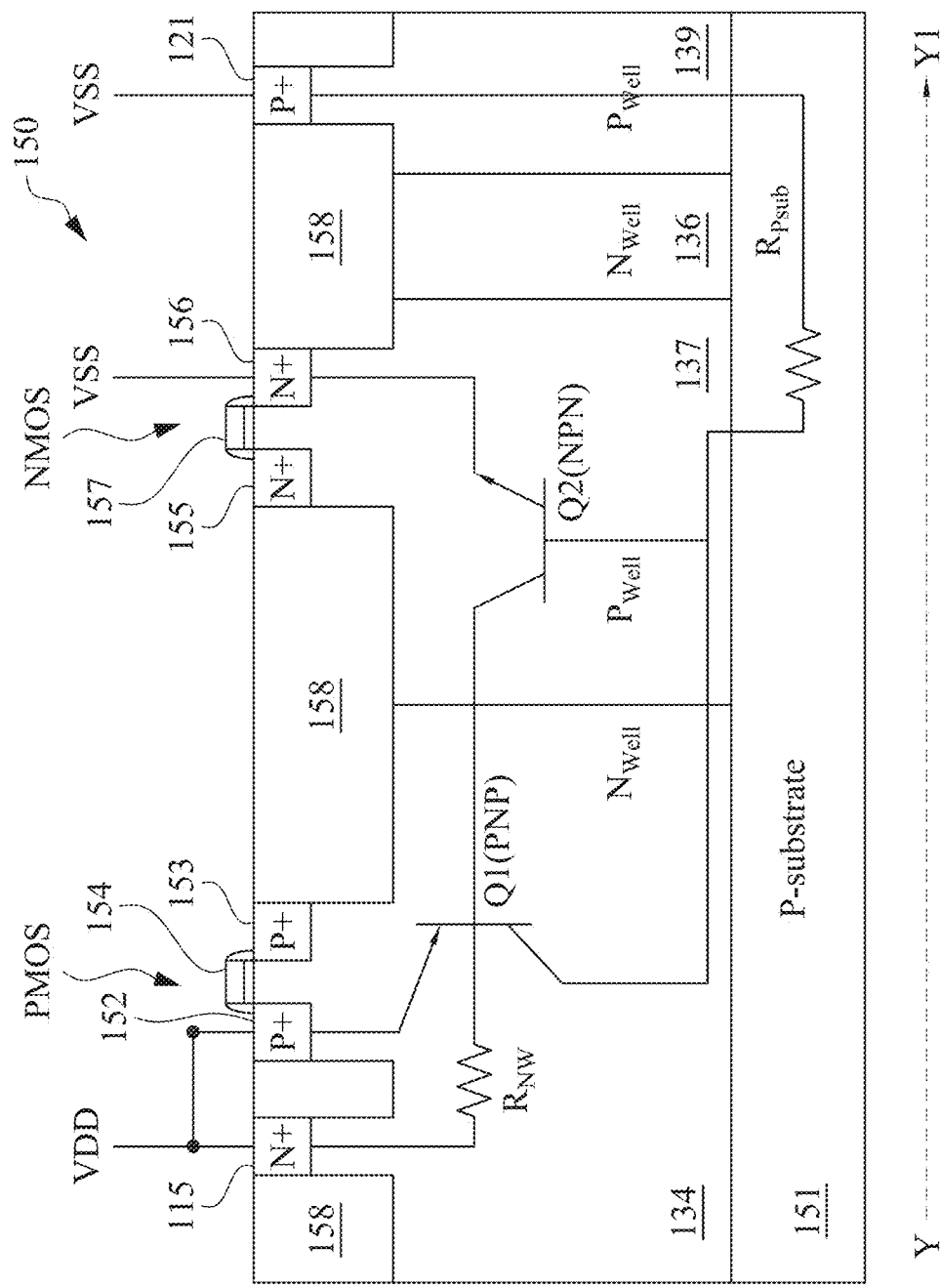
FIG. 1C is a schematic cross-sectional view combined with a schematic circuit diagram of an IC device, in accordance with some embodiments.

FIG. 1C is a schematic cross-sectional view of an IC device 150, in accordance with some embodiments. The IC device 150 corresponds to a portion of the IC layout diagram 100 which is indicated by arrow Y→Y1 in FIG. 1A. The cross-sectional view in FIG. 1C is also combined with a schematic circuit diagram of the IC device 150.

The IC device 150 comprises a substrate 151 on which the TAP cells, well regions, active regions, gate regions, fin features described with respect to FIGS. 1A and 1B are formed. For example, the IC device 150 comprises, on the substrate 151, the N well 134, P well 137, N well 136, and P well 139. P-type active regions 152, 153, and the NTAP cell 115 are formed in the N well 134. A gate region 154 is formed over the P-type active regions 152, 153, and defines together with the P-type active regions 152, 153 a PMOS. N-type active regions 155, 156 are formed in the P well 137. A gate region 157 is formed over the N-type active regions 155, 156, and defines together with the N-type active regions 155, 156 an NMOS. The PTAP cell 121 is formed in the P well 139. The IC device 150 further comprises a plurality of isolation regions 158 between adjacent P well and N well. The P-type active region 152 of the PMOS is coupled to a first power supply voltage, e.g., VDD. The N-type active region 156 of the NMOS is coupled to a second power supply voltage, e.g., VSS, which is in at least one embodiment, the ground. The substrate 151 is a P-type substrate.

The schematic circuit diagram of the IC device 150 in FIG. 1C shows parasitic transistors Q1 and Q2. The parasitic transistor Q1 is a PNP transistor formed by the P-type active region 152, the N well 134, and the P-type substrate 151. The parasitic transistor Q2 is an NPN transistor formed by the N well 134, the P well 137, and the N-type active region 156. In the absence of the NTAP cell 115 and/or the PTAP cell 121, there is a concern that a leakage current in one or more of the P-type substrate 151, P wells and N wells of the IC device 150 is sufficient to cause both of the parasitic transistors Q1 and Q2 to turn ON, and create a current path from VDD, through the turned ON parasitic transistors Q1 and Q2, to VSS. Such a current path between VDD and VSS is a latch-up situation that adversely affects performance of the IC device 150.

The provision of the NTAP cell 115 which is coupled to VDD and the PTAP cell 121 which is coupled to VSS reduces the likelihood of latch-up situations and improves LUP immunity of the IC device 150. In the schematic circuit diagram of the IC device 150 in FIG. 1A, a resistor $R_{NW}$ represents a TAP cell resistance between the NTAP cells, representative by the NTAP cell 115, and the base of the parasitic transistor Q1, whereas a resistor $R_{Psub}$ represents a TAP cell resistance between the PTAP cells, representative by the PTAP cell 121, and the base of the parasitic transistor Q2. The lower the resistances of the resistors $R_{NW}$ and $R_{Psub}$, the lower the likelihood of the parasitic transistors Q1 and Q2 being turned ON, respectively, the better the LUP immunity of the IC device 150. The resistance of the resistor $R_{NW}$ depends on a configuration and/or arrangement of NTAP cells. The resistance of the resistor $R_{Psub}$ depends on a configuration and/or arrangement of PTAP cells. For example, referring to FIG. 1A, the resistance of the resistor $R_{Psub}$ increases when the distance 2*DY between the adjacent elongated second TAP cells 120, 121 increase; however, the resistance of the resistor $R_{Psub}$ decreases when the length L or the number of fin features of the elongated second TAP cells 120, 121 increases. By configuring and/or arranging the NTAP cells and/or PTAP cells as described herein, it is possible in at least one embodiment to improve LUP immunity of the IC device 150.

As described herein, some other approaches for TAP cell placement suffer from some potential problems. For example, in a first approach, TAP cells are placed in a half-cell height arrangement across boundaries between P wells and N wells. Such a half-cell height arrangement faces manufacturing difficulties, especially at CD below 100 nm. In contrast, as described with respect to FIGS. 1A-1B, the TAP cells in some embodiments are completely enclosed within respective well regions, therefore avoiding manufacturing difficulties associated with the half-cell height arrangement. For another example, in the described first approach and in a different, second approach, there are concerns with respect to mixed channel effects due to implant discontinuity between closely arranged NTAP cells and PTAP cells. Such concerns of mixed channel effects are obviated by one or more embodiments described herein. In some embodiments, it is possible to achieve one or more effects, including, but not limited to, relaxing process constraints especially at advanced manufacturing process nodes, improving latch-up immunity, reducing of areas occupied or blocked by TAP cells, and increasing of areas where standard cells other than TAP cells are placeable. In some still further embodiments, with no process constraints at advanced manufacturing process nodes, it is possible to improve latch-up immunity and/or reduce areas occupied or blocked by TAP cells. In an example, the areas occupied or blocked by TAP cells is reduced, in at least one embodiment, to about 85% of that observed in other approaches, without sacrificing LUP immunity.

Figure 2:
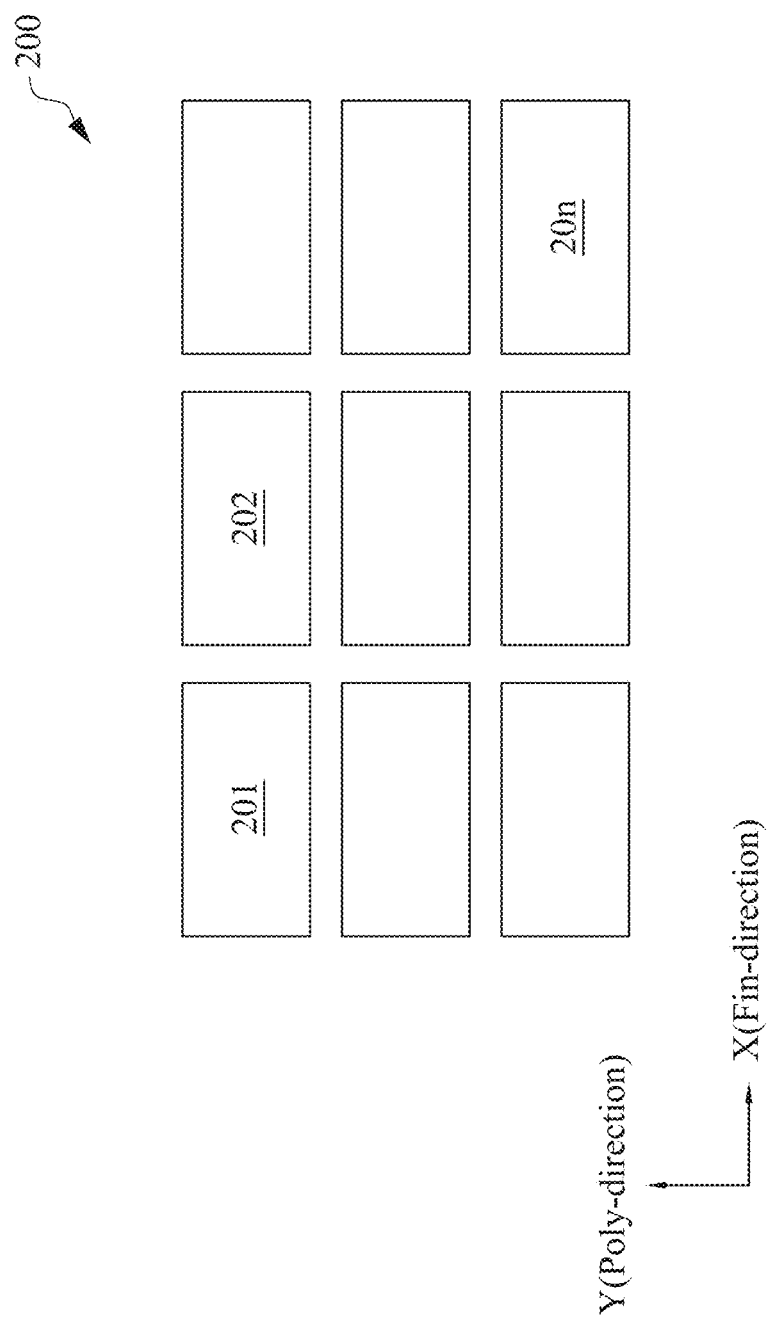
FIG. 2 is a schematic view of an IC layout diagram, in accordance with some embodiments.
Figure 3A:
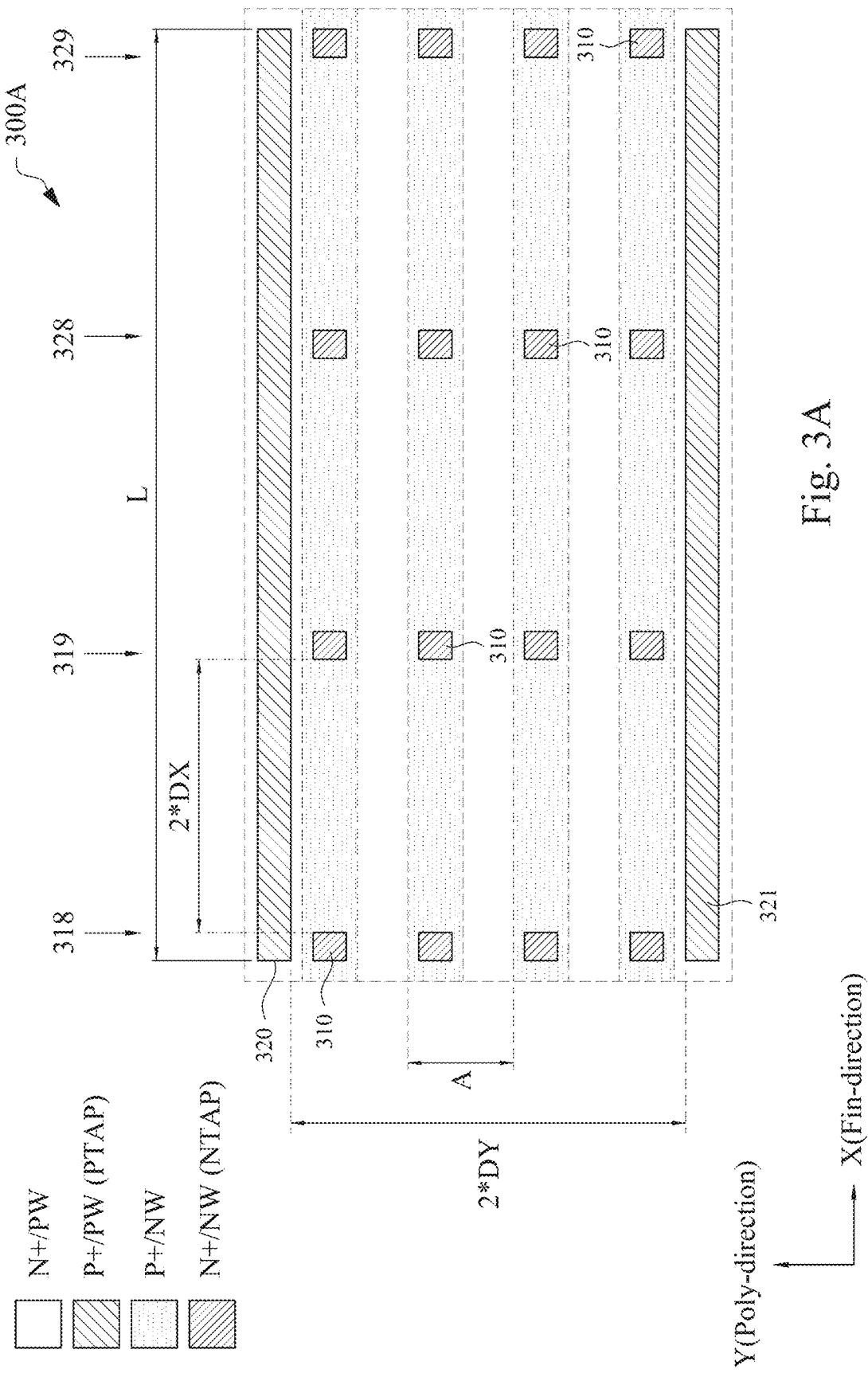
FIG. 3A is a schematic view of an IC layout diagram, in accordance with some embodiments.
Figure 3B:
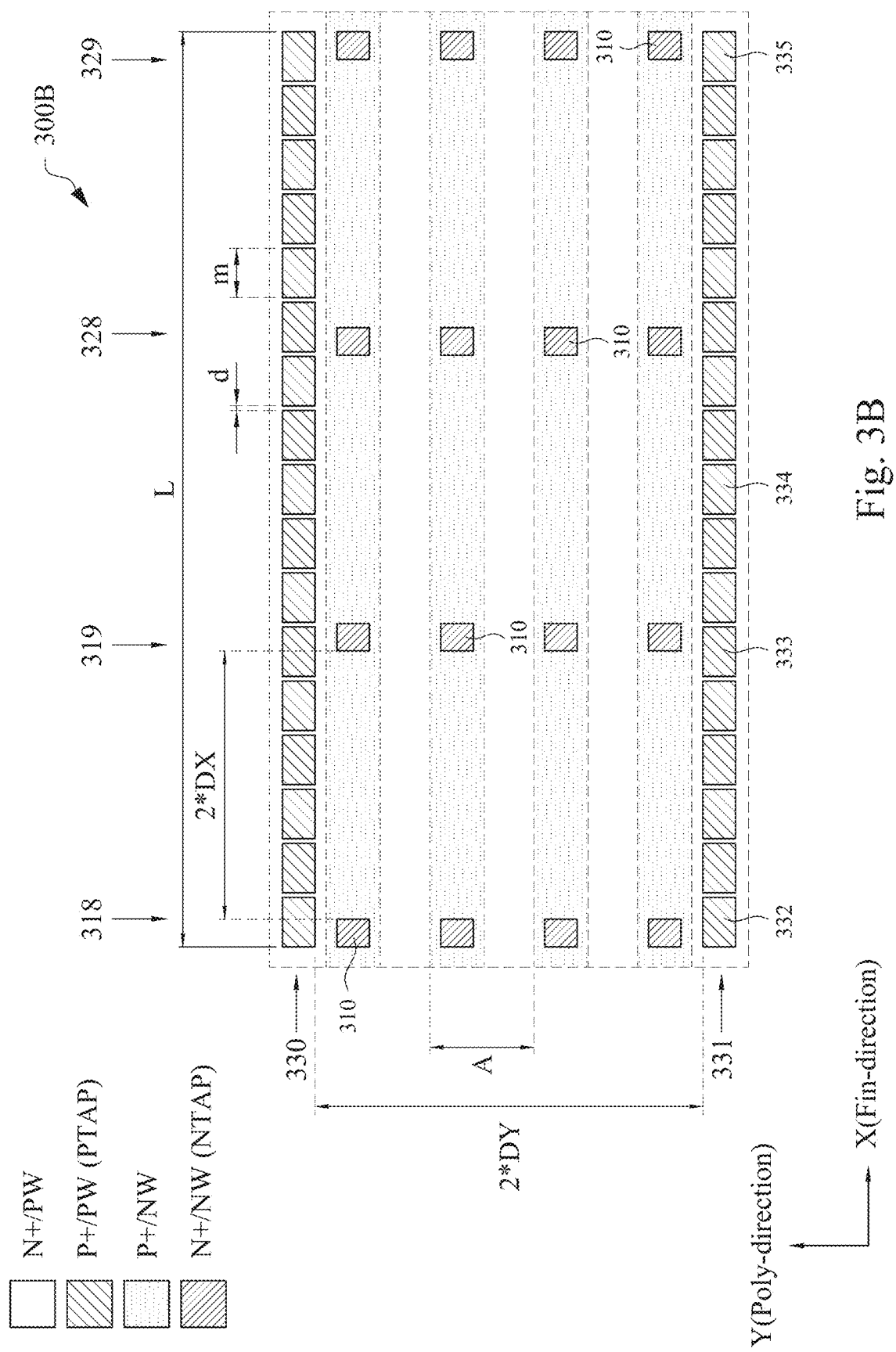
FIG. 3B is a schematic view of an IC layout diagram, in accordance with some embodiments.
Figure 4A:
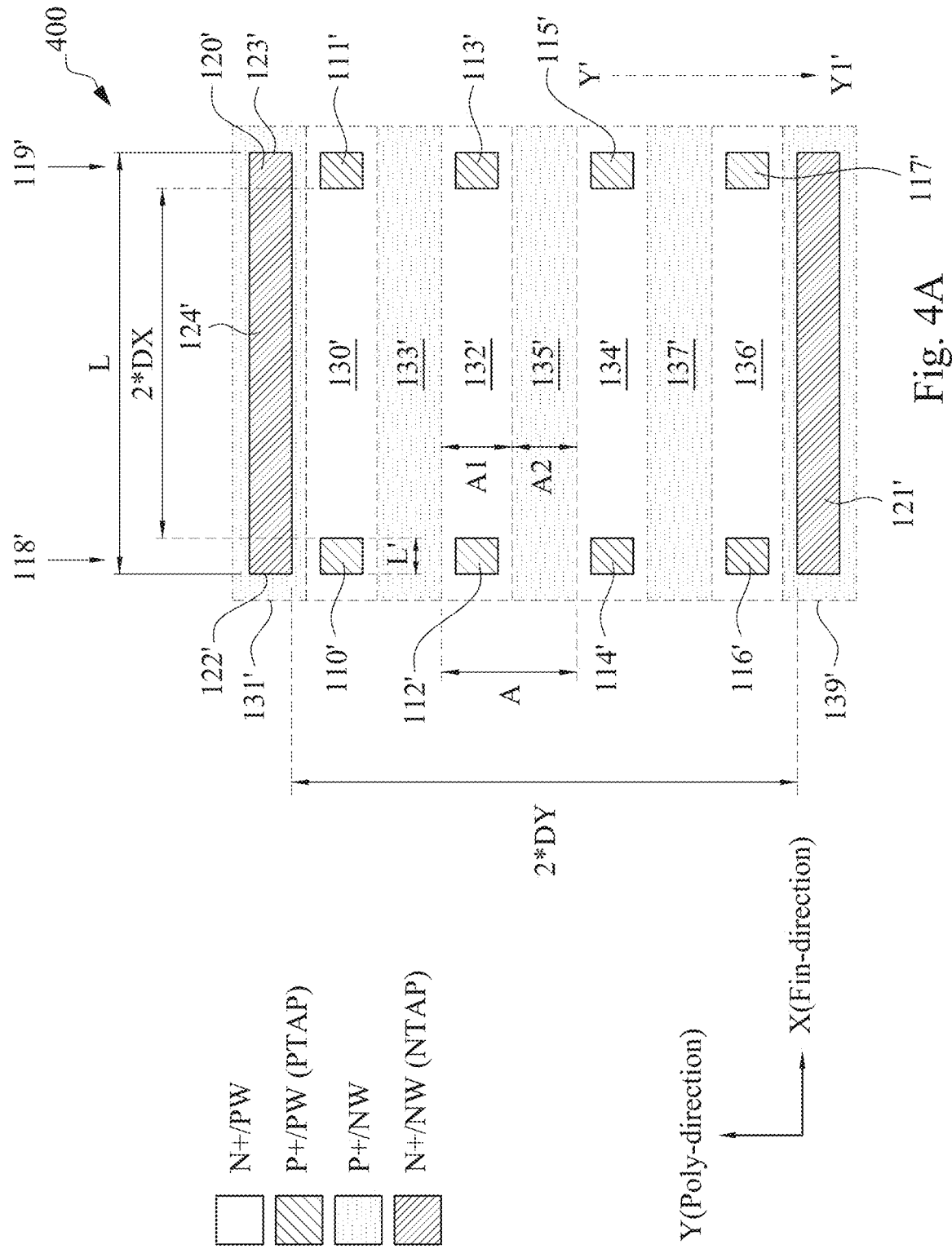
FIG. 4A is a schematic view of an IC layout diagram, in accordance with some embodiments.

FIG. 2 is a schematic view of an IC layout diagram 200, in accordance with some embodiments. The IC layout diagram 200 comprises a plurality of portions 201, 201, . . . 20n which are arranged at regular intervals in the X direction and Y direction. TAP cells are placed in each of the portions 201, 201, . . . 20n in similar manner. For example, in each of the portions 201, 201, . . . 20n, TAP cells are placed as described with respect to FIG. 1A in at least one embodiment. Other TAP cell placements as described with respect to FIGS. 3A, 3B, and 4A, are within the scopes of various embodiments. As a result, TAP cells are placed at regular intervals and in a repeating pattern over the IC layout diagram 200, to ensure intended LUP immunity over the IC layout diagram 200. In some embodiments, one or more advantages or effects described with respect to FIG. 1A are achievable in the IC layout diagram 200.

FIG. 3A is a schematic view of an IC layout diagram 300A, in accordance with some embodiments. In at least one embodiment, the IC layout diagram 300A corresponds to any of the portions 201, 201, . . . 20n in FIG. 2. Similarly to the IC layout diagram 100, the IC layout diagram 300A comprises a plurality of first TAP cells representatively indicated at 310, and a plurality of second TAP cells 320, 321. The first TAP cells 310 correspond to the first TAP cells 110-117 of the IC layout diagram 100, but are arranged in more than two columns, e.g., four columns 318, 319, 328, 329. The second TAP cells 320, 321 correspond to the second TAP cells 120, 121, and extend in the X direction across the four columns 318, 319, 328, 329 of the first TAP cells 310. In some embodiments, configurations, modifications, advantages or effects described with respect to FIG. 1A are achievable in the IC layout diagram 300A.

FIG. 3B is a schematic view of an IC layout diagram 300B, in accordance with some embodiments. In at least one embodiment, the IC layout diagram 300B corresponds to any of the portions 201, 201, . . . 20n in FIG. 2. Similarly to the IC layout diagram 300A, the IC layout diagram 300B comprises a plurality of first TAP cells 310, which are arranged in four columns 318, 319, 328, 329. However, instead of each of the continuous second TAP cells 320, 321 in the IC layout diagram 300A, the IC layout diagram 300B includes a series 330, 331 of discrete second TAP cells representatively indicated at 332, 333, 334, 335. The second TAP cells 332, 333, 334, 335 are arranged in a line along the X direction, at an interval d. The length L of each of the series 330, 331 for determining the number of fin features in the series is a total of length m of each second TAP cells 332, 333, 334, 335 in the series. In each of the series, e.g., series 331, a first end TAP cell 332 at a first end of the series 331 overlaps, in the Y direction, the first TAP cells in one of the columns, e.g., column 318. A second end TAP cell 335 at a second end of the series 331 overlaps, in the Y direction, first TAP cells in another column 329. The series 331 further comprises at least one middle TAP cell 334 between the first and second ends of the series 331, and overlapping no first TAP cell among the first TAP cells in the columns 318, 319, 328, 329. In some embodiments, configurations, modifications, advantages or effects described with respect to FIG. 1A are achievable in the IC layout diagram 300B.

FIG. 4A is a schematic view of an IC layout diagram 400, in accordance with some embodiments. The IC layout diagram 400 in FIG. 4A is similar to the IC layout diagram 100 in FIG. 1A, with the exception that P-type regions, wells or TAP cells in the IC layout diagram 400 correspond to N-type regions, wells or TAP cells in the IC layout diagram 100, and vice versa. An element in FIG. 4A is denoted by the same reference numeral as a corresponding element in FIG. 1A, but with the prime symbol added to FIG. 4A. For example, a well region 130' in FIG. 4A corresponds to the well region 130 in FIG. 1A. In at least one embodiment, an IC device corresponding to the IC layout diagram 400 is formed on an N-type substrate, as described with respect to FIG. 4B.

Figure 4B:
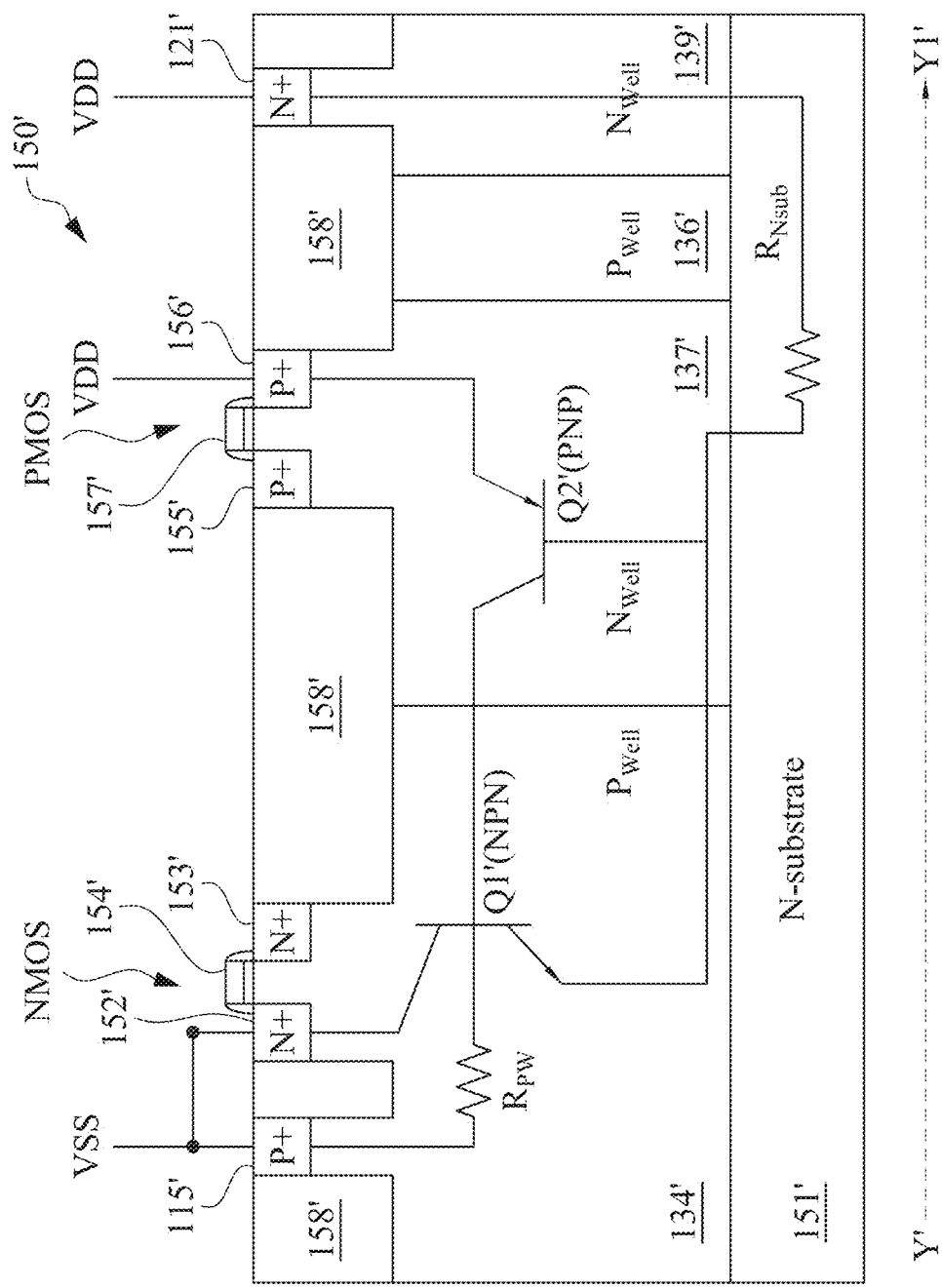
FIG. 4B is a schematic cross-sectional view combined with a schematic circuit diagram of an IC device, in accordance with some embodiments.

FIG. 4B is a schematic cross-sectional view of an IC device 150', in accordance with some embodiments. The IC device 150' corresponds to a portion of the IC layout diagram 400 which is indicated by arrow Y'→Y1' in FIG. 4A. The cross-sectional view in FIG. 4B is also combined with a schematic circuit diagram of the IC device 150'. The IC device 150' in FIG. 4B is similar to the IC device 150 in FIG. 1C, with the exception that P-type substrate, regions, wells, TAP cells, in the IC device 150' correspond to N-type substrate, regions, wells, TAP cells in the IC device 150, and vice versa. An element in FIG. 4B is denoted by the same reference numeral as a corresponding element in FIG. 1C, but with the prime symbol added to FIG. 4B. For example, a substrate 151' in FIG. 4B corresponds to the substrate 151 in FIG. 1C. Further, NMOS, PMOS, Q1'(NPN), Q2'(PNP), $R_{PW}$ and $R_{Nsub}$ in FIG. 4B correspond to PMOS, NMOS, Q1(PNP), Q2(NPN), $R_{NW}$ and $R_{Psub}$ in FIG. 1C, respectively.

In some embodiments, configurations, operations, modifications, advantages or effects described with respect to the IC layout diagram 100 in FIG. 1A and/or the IC device 150 in FIG. 1C are achievable in the IC layout diagram 400 in FIG. 4A and/or the IC device 150' in FIG. 4B. Some embodiments include IC layout diagrams similar to the IC layout diagram 300A or 300B, but with similar changes from P-type substrate, wells, regions or TAP cells to N-type substrate, wells, regions or TAP cells, respectively, and vice versa.

Figure 5:
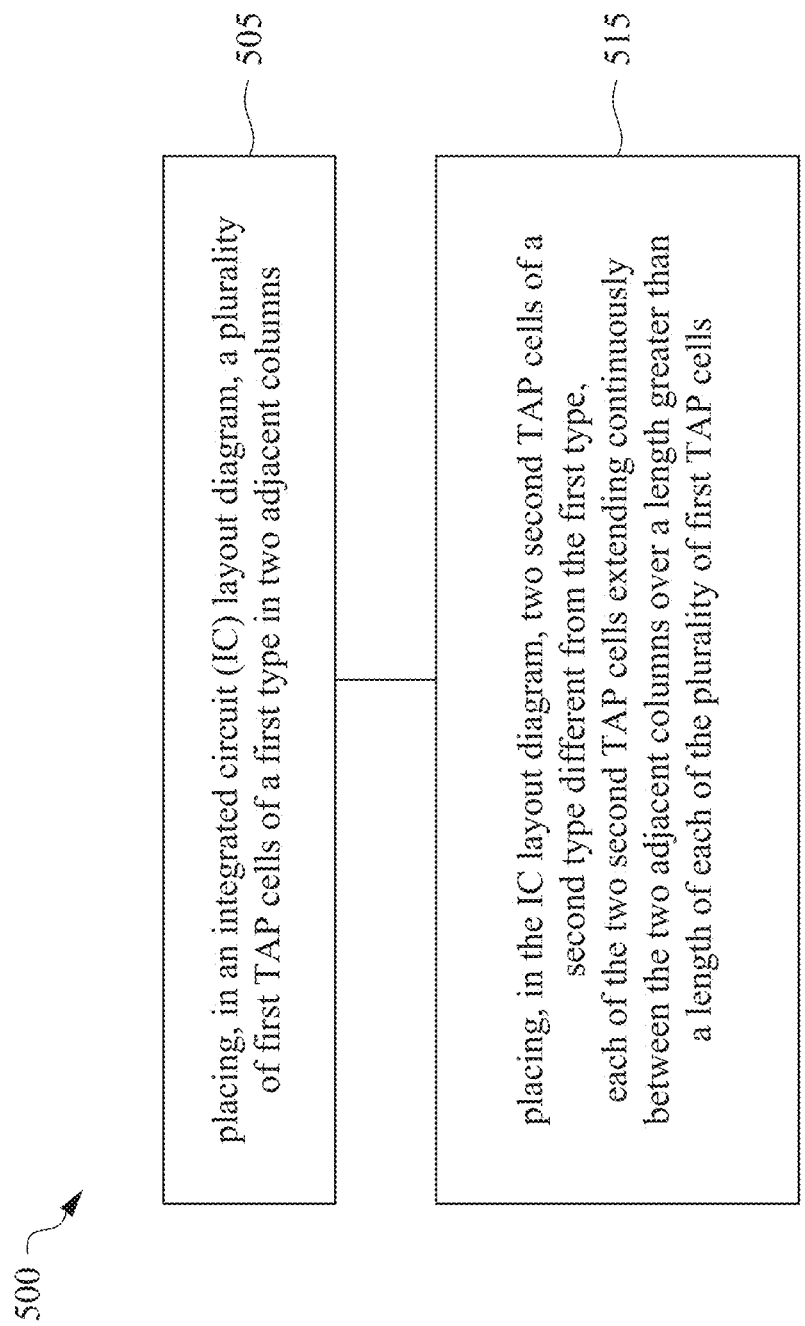
FIG. 5 is a flow chart of a method of generating an IC layout diagram, in accordance with some embodiments.

FIG. 5 is a flow chart of a method 500 for TAP cell placement in an IC layout diagram, in accordance with some embodiments. In at least one embodiment, the method 500 is performed in whole or in part by a processor as described herein, to generate an IC layout diagram corresponding to at least one of the IC layout diagrams 100, 200, 300A, 300B and 400.

At operation 505, a plurality of first TAP cells is placed in an IC layout diagram such that the first TAP cells are arranged in two adjacent columns. For example, as described with respect to FIG. 1A, a plurality of first TAP cells 110-117 is placed in the IC layout diagram 100 such that the first TAP cells 110-117 are arranged in two adjacent columns 118, 119. The two adjacent columns 118, 119 are adjacent each other in a first direction, e.g., the X direction, and extend in a second direction, e.g., the Y direction, transverse to the first direction. The first TAP cells 110-117 are of a first semiconductor type, e.g., N-type as in FIG. 1A, or P-type as in FIG. 4A.

At operation 515, two second TAP cells of a second semiconductor type different from the first semiconductor type are placed in the IC layout diagram. Each of the two second TAP cells extends continuously between the two adjacent columns of the first TAP cells over a second length greater than a first length of each of the first TAP cells. For example, as described with respect to FIG. 1A, two second TAP cells 120, 121 are placed in the IC layout diagram 100. Each of the two second TAP cells 120, 121 extends continuously between the two adjacent columns 118, 119 of the first TAP cells 110-117 over a length L greater than a length L' of each of the first TAP cells 110-117. The two adjacent columns 118, 119 of the first TAP cells 110-117 are located between the two second TAP cells 120, 121 in the Y direction. The second TAP cells 120, 121 are of a second semiconductor type, e.g., P-type as in FIG. 1A, or N-type as in FIG. 4A.

In at least one embodiment, operations 505 and 515 occur concurrently, e.g., in a place and route operation of an IC manufacturing flow. In one or more embodiments, the first TAP cells and/or the second TAP cells are standard cells stored in and read from one or more cell libraries. In some embodiments, operations 505 and 515 are performed to place TAP cells at regular intervals and in a repeating pattern over the IC layout diagram, as described with respect to FIG. 2.

The described methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

Figure 6:
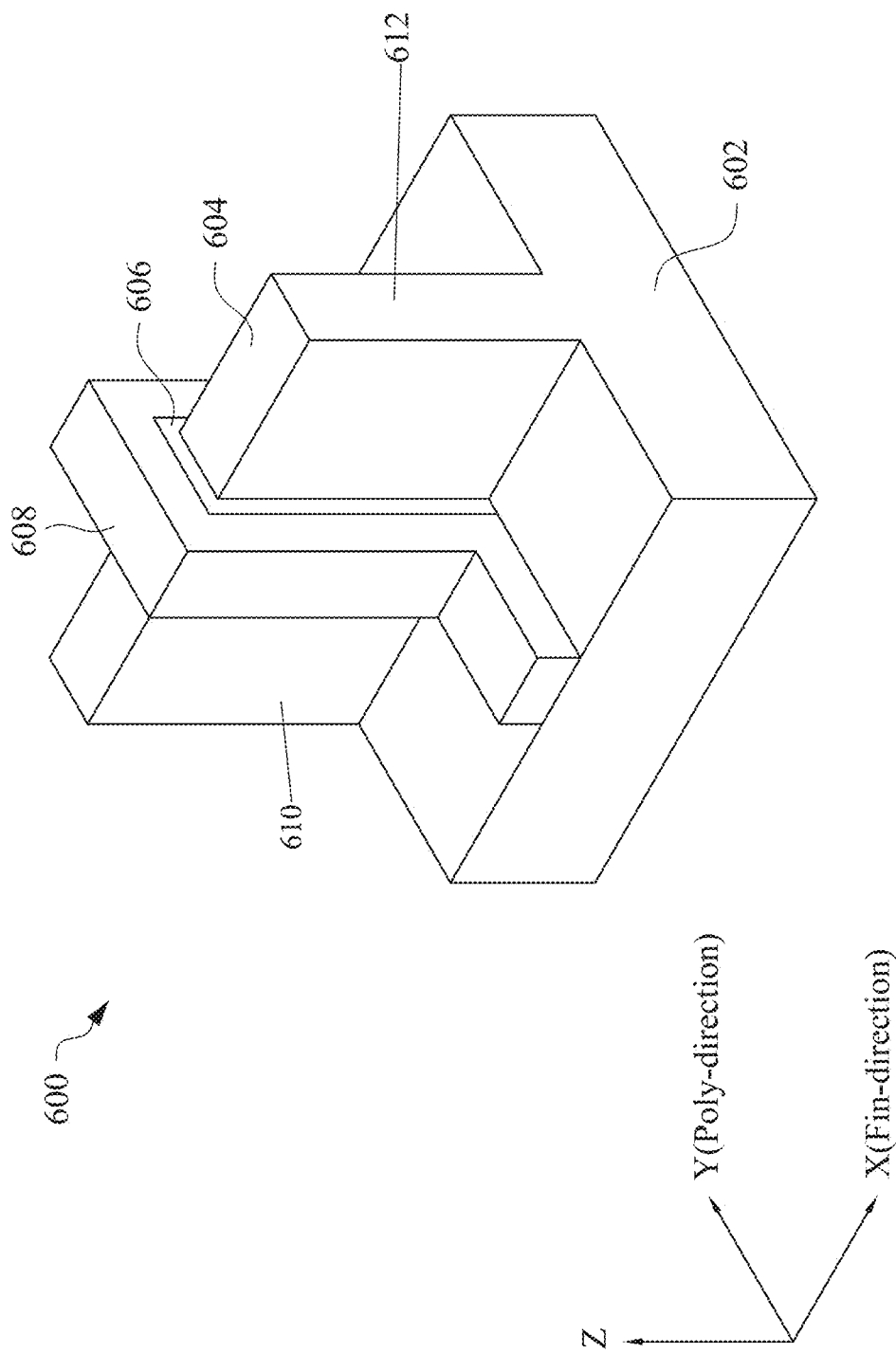
FIG. 6 is a perspective view of an example transistor having a fin feature, in accordance with some embodiments.

FIG. 6 is a perspective view of an example circuit element 600 having a fin feature, in accordance with some embodiments. In the example configuration in FIG. 6, circuit element 600 is a fin field-effect transistor (FINFET). FINFET 600 comprises a substrate 602, at least one fin feature (or fin) 604 extending in a Z direction from substrate 602, a gate dielectric 606 along surfaces of fin 604, and a gate electrode 608 over gate dielectric 606. A source region 610 and a drain region 612 are disposed over substrate 602 on opposite sides of fin 604. Fin 604, source region 610 and drain region 612 belong to an active region (or OD region) which corresponds, in one or more embodiments, to any active region described with respect to FIGS. 1A-4B. In at least one embodiment, gate electrode 608 corresponds to any gate region described with respect to FIGS. 1A-4B. The described configuration of a fin feature in an active region is an example. Other configurations are within the scopes of various embodiments.

In some embodiments, some or all of the methods discussed above are performed by an IC layout diagram generation system. In some embodiments, an IC layout diagram generation system is usable as part of a design house of an IC manufacturing system discussed below.

Figure 7:
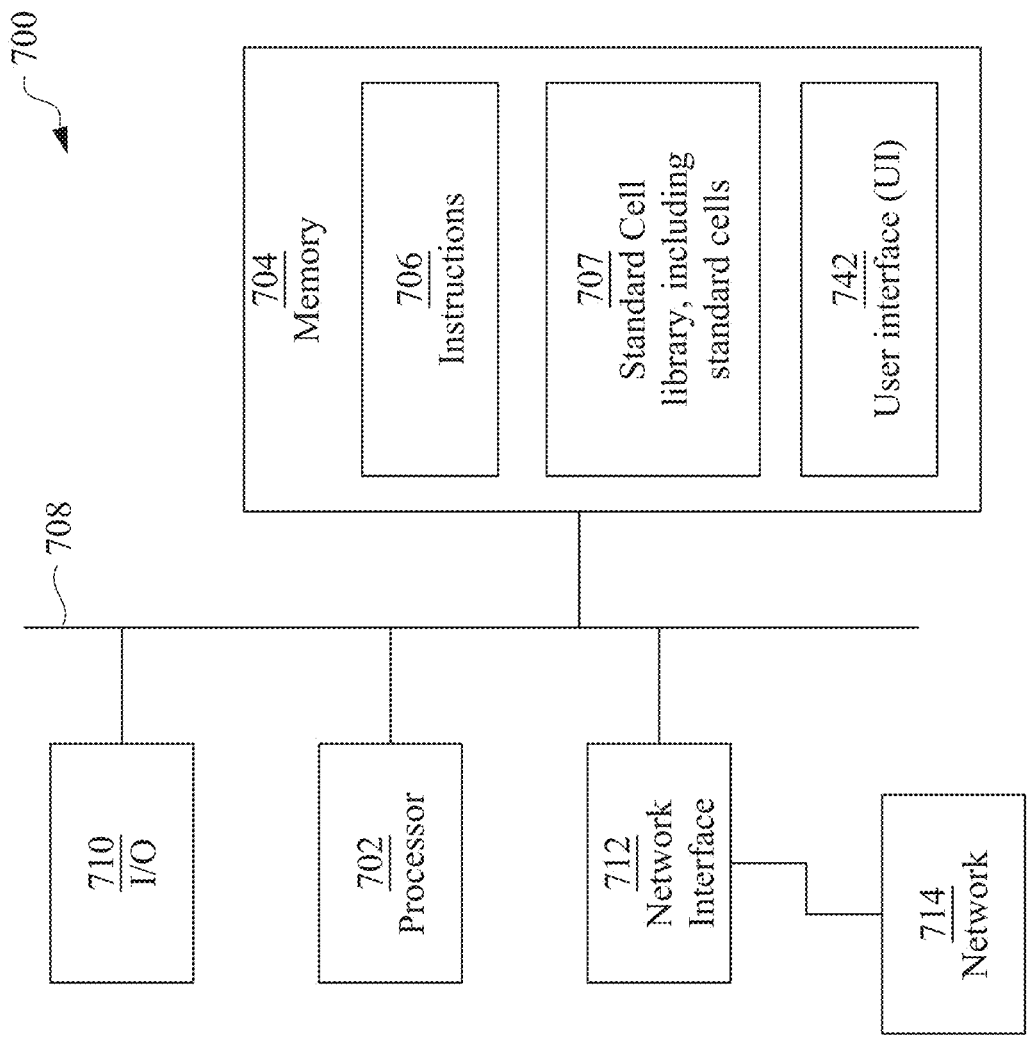
FIG. 7 is a block diagram of an EDA system, in accordance with some embodiments.

FIG. 7 is a block diagram of EDA system 700 in accordance with some embodiments.

In some embodiments, EDA system 700 includes an automated placement and routing (APR) system. Methods described herein of designing layout diagrams and representing wire routing arrangements, in accordance with one or more embodiments, are implementable, for example, using EDA system 700, in accordance with some embodiments.

In some embodiments, EDA system 700 is a general purpose computing device including a hardware processor 702 and a non-transitory, computer-readable storage medium 704. Storage medium 704, amongst other things, is encoded with, i.e., stores, computer program code 706, i.e., a set of executable instructions. Execution of instructions 706 by hardware processor 702 represents (at least in part) an EDA tool which implements a portion or all of, e.g., the methods described herein in accordance with one or more embodiments (hereinafter, the noted processes and/or methods).

Processor 702 is electrically coupled to computer-readable storage medium 704 via a bus 708. Processor 702 is also electrically coupled to an I/O interface 710 by bus 708. A network interface 712 is also electrically connected to processor 702 via bus 708. Network interface 712 is connected to a network 714, so that processor 702 and computer-readable storage medium 704 are capable of connecting to external elements via network 714. Processor 702 is configured to execute computer program code 706 encoded in computer-readable storage medium 704 in order to cause EDA system 700 to perform a portion or all of the noted processes and/or methods. In one or more embodiments, processor 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code 706 configured to cause EDA system 700 (where such execution represents (at least in part) the EDA tool) to perform a portion or all of the noted processes and/or methods. In one or more embodiments, storage medium 704 also stores information which facilitates performing a portion or all of the noted processes and/or methods. In one or more embodiments, storage medium 704 stores a library 707 of standard cells, including HPC cells as disclosed herein.

EDA system 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702.

EDA system 700 also includes network interface 712 coupled to processor 702. Network interface 712 allows EDA system 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more EDA systems 700.

EDA system 700 is configured to receive information through I/O interface 710. The information received through I/O interface 710 includes one or more of instructions, data, design rules, libraries of standard cells, and/or other parameters for processing by processor 702. The information is transferred to processor 702 via bus 708. EDA system 700 is configured to receive information related to a UI through I/O interface 710. The information is stored in computer-readable medium 704 as user interface (UI) 742.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 700. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 8:
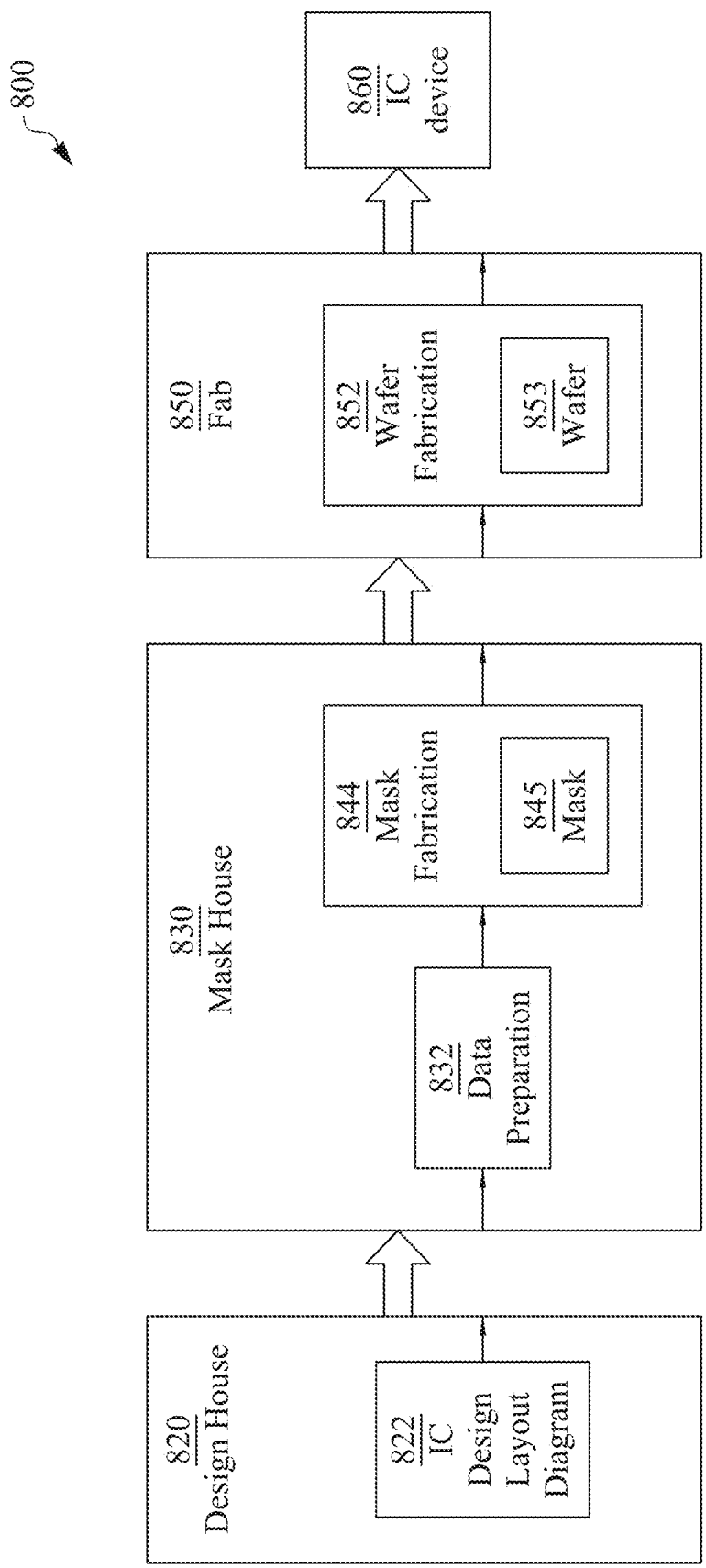
FIG. 8 is a block diagram of an IC manufacturing system and an IC manufacturing flow associated therewith, in accordance with some embodiments.

FIG. 8 is a block diagram of an integrated circuit (IC) manufacturing system 800, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 800.

In FIG. 8, IC manufacturing system 800 includes entities, such as a design house 820, a mask house 830, and an IC manufacturer/fabricator ("fab") 850, that interact with one another in the design, development, and manufacturing cycles and/or services related to manufacturing an IC device 860. The entities in system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single larger company. In some embodiments, two or more of design house 820, mask house 830, and IC fab 850 coexist in a common facility and use common resources.

Design house (or design team) 820 generates an IC design layout diagram 822. IC design layout diagram 822 includes various geometrical patterns designed for IC device 860. The geometrical patterns correspond to patterns of metal, oxide, or semiconductor layers that make up the various components of IC device 860 to be fabricated. The various layers combine to form various IC features. For example, a portion of IC design layout diagram 822 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 820 implements a proper design procedure to form IC design layout diagram 822. The design procedure includes one or more of logic design, physical design or place and route. IC design layout diagram 822 is presented in one or more data files having information of the geometrical patterns. For example, IC design layout diagram 822 is expressed in a GDSII file format or DFII file format.

Mask house 830 includes data preparation 832 and mask fabrication 844. Mask house 830 uses IC design layout diagram 822 to manufacture one or more masks 845 to be used for fabricating the various layers of IC device 860 according to IC design layout diagram 822. Mask house 830 performs mask data preparation 832, where IC design layout diagram 822 is translated into a representative data file ("RDF"). Mask data preparation 832 provides the RDF to mask fabrication 844. Mask fabrication 844 includes a mask writer. A mask writer converts the RDF to an image on a substrate, such as a mask (reticle) 845 or a semiconductor wafer 853. The design layout diagram 822 is manipulated by mask data preparation 832 to comply with particular characteristics of the mask writer and/or requirements of IC fab 850. In FIG. 8, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects and the like. OPC adjusts IC design layout diagram 822. In some embodiments, mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 832 includes a mask rule checker (MRC) that checks the IC design layout diagram 822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 822 to compensate for limitations during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout diagram 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 822.

It should be understood that the above description of mask data preparation 832 has been simplified for the purposes of clarity. In some embodiments, data preparation 832 includes additional features such as a logic operation (LOP) to modify the IC design layout diagram 822 according to manufacturing rules. Additionally, the processes applied to IC design layout diagram 822 during data preparation 832 may be executed in a variety of different orders.

After mask data preparation 832 and during mask fabrication 844, a mask 845 or a group of masks 845 are fabricated based on the modified IC design layout diagram 822. In some embodiments, mask fabrication 844 includes performing one or more lithographic exposures based on IC design layout diagram 822. In some embodiments, an electron-beam (e-beam) or a mechanism of multiple e-beams is used to form a pattern on a mask (photomask or reticle) 845 based on the modified IC design layout diagram 822. Mask 845 can be formed in various technologies. In some embodiments, mask 845 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 845 includes a transparent substrate (e.g., fused quartz) and an opaque material (e.g., chromium) coated in the opaque regions of the binary mask. In another example, mask 845 is formed using a phase shift technology. In a phase shift mask (PSM) version of mask 845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 844 is used in a variety of processes. For example, such a mask(s) is used in an ion implantation process to form various doped regions in semiconductor wafer 853, in an etching process to form various etching regions in semiconductor wafer 853, and/or in other suitable processes.

IC fab 850 includes wafer fabrication 852. IC fab 850 is an IC fabrication business that includes one or more manufacturing facilities for the fabrication of a variety of different IC products. In some embodiments, IC Fab 850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 uses mask(s) 845 fabricated by mask house 830 to fabricate IC device 860. Thus, IC fab 850 at least indirectly uses IC design layout diagram 822 to fabricate IC device 860. In some embodiments, semiconductor wafer 853 is fabricated by IC fab 850 using mask(s) 845 to form IC device 860. In some embodiments, the IC fabrication includes performing one or more lithographic exposures based at least indirectly on IC design layout diagram 822. Semiconductor wafer 853 includes a silicon substrate or other proper substrate having material layers formed thereon. Semiconductor wafer 853 further includes one or more of various doped regions, dielectric features, multilevel interconnects, and the like (formed at subsequent manufacturing steps).

Details regarding an integrated circuit (IC) manufacturing system (e.g., system 800 of FIG. 8), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In some embodiments, an integrated circuit (IC) device comprises a plurality of first doped regions of a first semiconductor type over at least one first well region of the first semiconductor type, and a second doped region of a second semiconductor type over a second well region of the second semiconductor type, the second semiconductor type different from the first semiconductor type. The plurality of first doped regions is arranged along a first direction. Each of the plurality of first doped regions has a first length in the first direction. The second doped region extends in the first direction between at least two first doped regions among the plurality of first doped regions over a second length greater than the first length.

In some embodiments, a method of manufacturing an integrated circuit (IC) device comprises forming, over a substrate, a plurality of first well regions of a first semiconductor type and forming, over the substrate, two second well regions of a second semiconductor type different from the first semiconductor type. The method further comprises forming a plurality of first doped regions of the first semiconductor type over the plurality of first well regions, and forming two second doped regions of the second semiconductor type correspondingly over the two second well regions. The plurality of first well regions and the two second well regions are elongated along a first direction. The plurality of first well regions are arranged, in a second direction transverse to the first direction, between the two second well regions. Each of the plurality of first doped regions has a first length in the first direction. Each of the two second doped regions has, in the first direction, a second length greater than the first length.

In some embodiments, a method of manufacturing an integrated circuit (IC) device comprises forming, over a substrate, a first well region of a first semiconductor type, and forming, over the substrate, a second well region of a second semiconductor type different from the first semiconductor type. The first well region and the second well region are elongated along a first direction. The method further comprises forming a plurality of first doped regions of the first semiconductor type over the first well region and at an interval along the first direction, and forming a second doped region of the second semiconductor type over the second well region. The second doped region is elongated in the first direction and overlaps, in a second direction transverse to the first direction, multiple first doped regions among the plurality of first doped regions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit (IC) device, comprising:
a plurality of first doped regions of a first semiconductor type over at least one first well region of the first semiconductor type; and
a second doped region of a second semiconductor type over a second well region of the second semiconductor type, the second semiconductor type different from the first semiconductor type,
wherein
the plurality of first doped regions is arranged along a first direction,
each of the plurality of first doped regions has a first length in the first direction,
the second doped region extends in the first direction between at least two first doped regions among the plurality of first doped regions over a second length greater than the first length,
the plurality of first doped regions is configured to receive a first power supply voltage,
the second doped region is configured to receive a second power supply voltage different from the first power supply voltage,
the plurality of first doped regions is arranged in at least two columns which are adjacent each other in the first direction and elongated in a second direction transverse to the first direction, and
each column of the at least two columns includes multiple first doped regions among the plurality of first doped regions, wherein two immediately adjacent first doped regions among the multiple first doped regions in the column are separated from each other, in the second direction, by a region containing dopants of the second semiconductor type.

2. The IC device of claim 1, further comprising:
a substrate on which the plurality of first doped regions and the second doped region are arranged,
wherein the substrate is of the second semiconductor type.

3. The IC device of claim 1, further comprising:
another second doped region of the second semiconductor type over another second well region of the second semiconductor type, the another second doped region extending in the first direction between the at least two first doped regions over the second length greater than the first length,
the another second doped region is configured to receive the second power supply voltage, and
the plurality of first doped regions is arranged in the second direction between the second doped region and the another second doped region.

4. The IC device of claim 3, further comprising:
a plurality of first well regions of the first semiconductor type and including the at least one first well region, each of the plurality of first doped regions in a corresponding one of the plurality of first well regions;
a plurality of second well regions of the second semiconductor type and including the second well region and the another second well region, the plurality of first well regions and the plurality of second well regions extending in the first direction and arranged alternatingly in the second direction; and
fin features extending in the first direction,
wherein $$F2/F1 \geq (DY/DX)*(L/A),$$

where
F1 is a number of fin features in each of the plurality of first doped regions,
F2 is a number of fin features in each of the second doped region and the another second doped region,
DX is a half of a first distance in the first direction between facing sides of the at least two first doped regions,
DY is a half of a second distance in the second direction between facing sides of the second doped region and the another second doped region,
L is the second length of the second doped region or the another second doped region in the first direction, and
A is a sum of a height, in the second direction, of a first well region among the plurality of first well regions and a height, in the second direction, of an adjacent second well region among the plurality of second well regions.

5. The IC device of claim 4, satisfying at least one of
DY is from 0.5 μm to 1000 μm,
DX is from 0.05 μm to 100 μm,
L is from 0.1 μm to 5000 μm, or
A is from 0.025 μm to 0.300 μm.

6. The IC device of claim 4, further comprising:
gate regions extending in the second direction,
wherein each of F1 and F2 is defined by $$(L_{OD}/CPP)*W*Fn,$$

where
$L_{OD}$ is the first length of a corresponding first doped region, or the second length of the second doped region or the another second doped region,
CPP is a pitch between adjacent gate regions in the first direction,
W is the height of the corresponding first doped region, the second doped region, or the another second doped region in the second direction, and
Fn is a number of fin features per unit height in the second direction.

7. The IC device of claim 1, further comprising:
a plurality of first well regions of the first semiconductor type and including the at least one first well region, each of the plurality of first doped regions in a corresponding one of the plurality of first well regions;
a plurality of second well regions of the second semiconductor type and including the second well region; and
a substrate on which the plurality of first well regions, the plurality of second well regions, the plurality of first doped regions and the second doped region are arranged,
wherein
the first semiconductor type is N-type, the second semiconductor type is P-type, and the substrate is a P-type substrate, or
the first semiconductor type is P-type, the second semiconductor type is N-type, and the substrate is an N-type substrate.

8. The IC device of claim 1, wherein
the second doped region overlaps, in the second direction, at least one first doped region among the plurality of first doped regions.

9. The IC device of claim 1, wherein
the second doped region overlaps, in the second direction, at least one column of the at least two columns in which the plurality of first doped regions is arranged.

10. The IC device of claim 1, wherein
the second doped region extends continuously in the first direction between first and second ends thereof,
the first end of the second doped region overlaps, in the second direction, one of the at least two first doped regions, and
the second end of the second doped region overlaps, in the second direction, another one of the at least two first doped regions.

11. The IC device of claim 1, wherein
the second doped region includes a series of second doped regions arranged along the first direction,
two immediately adjacent second doped regions in the series of second doped regions are separated from each other, in the first direction, by a section of the second well region which contains dopants of the second semiconductor type at a concentration lower than the second doped regions in the series, and
the series of second doped regions includes:
a first end doped region at a first end of the series of second doped regions and overlapping, in the second direction, one of the at least two first doped regions,
a second end doped region at a second end of the series of second doped regions and overlapping, in the second direction, another one of the at least two first doped regions, and
a middle doped region between the first and second ends of the series of second doped regions and overlapping, in the second direction, no first doped region among the plurality of first doped regions.

12. The IC device of claim 1, wherein
the at least two columns comprise more than two columns, and
the plurality of first doped regions in the more than two columns overlap, in the second direction, the second doped region.

13. An integrated circuit (IC) device, comprising:
a substrate;
over the substrate, a plurality of first well regions of a first semiconductor type;
over the substrate, a plurality of second well regions of a second semiconductor type different from the first semiconductor type, wherein
the plurality of first well regions and the plurality of second well regions are elongated along a first direction,
the plurality of first well regions and the plurality of second well regions are alternatingly arranged along a second direction transverse to the first direction, and
two immediately adjacent first well regions among the plurality of first well regions are separated from each other, in the second direction, by a second well region among the plurality of second well regions;
a plurality of first doped regions of the first semiconductor type over the plurality of first well regions; and
two second doped regions of the second semiconductor type correspondingly over two end second well regions among the plurality of second well regions,
wherein
the plurality of first well regions and one or more further second well regions among the plurality of second well regions are arranged, in the second direction, between the two end second well regions, each of the plurality of first doped regions has a first length in the first direction, each of the two second doped regions has, in the first direction, a second length greater than the first length.

14. The IC device of claim 13, wherein no other doped regions of the second semiconductor type are arranged, in the second direction, between the two second doped regions.

15. The IC device of claim 13, wherein each of the two second doped regions has
- a first end overlapping, in the second direction, some first doped regions among the plurality of first doped regions, and
- a second end overlapping, in the second direction, some further first doped regions among the plurality of first doped regions.

16. The IC device of claim 13, wherein the plurality of first doped regions is arranged in two adjacent columns, which are adjacent each other in the first direction, and each column of the two adjacent columns includes multiple first doped regions among the plurality of first doped regions, the multiple first doped regions arranged in the column along the second direction.

17. The IC device of claim 16, further comprising:

fin features extending in the first direction, wherein $$F2/F1 \geq (DY/DX)*(L/A),$$

where

F1 is a number of fin features in each of the plurality of first doped regions,

F2 is a number of fin features in each of the two second doped regions,

DX is a half of a first distance in the first direction between facing sides of the two adjacent columns, DY is a half of a second distance in the second direction between facing sides of the two second doped regions, L is the second length of each of the two second doped regions in the first direction, and A is a sum of a height, in the second direction, of a first well region among the plurality of first well regions and a height, in the second direction, of an adjacent second well region among the plurality of second well regions.

18. The IC device of claim 13, wherein the plurality of first doped regions and the two second doped regions are arranged at regular intervals in the first direction and the second direction over an area of the IC device.

19. An integrated circuit (IC) device, comprising:

a substrate;

over the substrate, a first well region of a first semiconductor type;

over the substrate, a second well region of a second semiconductor type different from the first semiconductor type, wherein the first well region and the second well region are elongated along a first direction;

a plurality of first doped regions of the first semiconductor type over the first well region, wherein the plurality of first doped regions is discontinuous from each other and arranged at a first interval along the first direction; and a plurality of second doped regions of the second semiconductor type over the second well region, wherein the plurality of second doped regions is discontinuous from each other and arranged, along the first direction, at a second interval smaller than the first interval, wherein the first interval along the first direction between two immediately adjacent first doped regions among the plurality of first doped regions is a section of the first well region which contains dopants of the first semiconductor type at a concentration lower than the plurality of first doped regions, and the section of the first well region overlaps, in a second direction transverse to the first direction, multiple second doped regions among the plurality of second doped regions, and the second interval along the first direction between two immediately adjacent second doped regions among the plurality of second doped regions is a section of the second well region which contains dopants of the second semiconductor type at a concentration lower than the plurality of second doped regions.

20. The IC device of claim 19, further comprising:

over the substrate, a further second well region of the second semiconductor type; and a plurality of further second doped regions of the second semiconductor type over the further second well region, wherein the plurality of further second doped regions is discontinuous from each other and arranged at the second interval along the first direction, the second interval between two immediately adjacent further second doped regions among the plurality of further second doped regions is a section of the further second well region which contains dopants of the second semiconductor type at a concentration lower than the plurality of further second doped regions, and one second doped region among the plurality of second doped regions and a further second doped region among the plurality of further second doped regions are adjacent each other in the second direction, and sandwich therebetween multiple first doped regions of the plurality of first doped regions.

* * * * *